(12) United States Patent
Vogt et al.

(10) Patent No.: US 11,198,424 B2
(45) Date of Patent: Dec. 14, 2021

(54) METHOD AND CONTROL APPARATUS FOR OPERATING A HYBRID ELECTRIC VEHICLE

(71) Applicant: AUDI AG, Ingolstadt (DE)

(72) Inventors: Michael Vogt, Munich (DE);
Alexander Kruse, Ingolstadt (DE);
Stefan Appel, Munich (DE);
Christopher Hohm, Munich (DE)

(73) Assignee: AUDI AG, Ingolstadt (DE)

( * ) Notice: Subject to any disclaimer, the term of this patent is extended or adjusted under 35 U.S.C. 154(b) by 279 days.

(21) Appl. No.: 16/438,892

(22) Filed: Jun. 12, 2019

(65) Prior Publication Data

US 2020/0010075 A1   Jan. 9, 2020

(30) Foreign Application Priority Data

Jul. 5, 2018   (DE) .......................... 102018211134.0

(51) Int. Cl.
| | |
|---|---|
| *B60W 20/13* | (2016.01) |
| *B60W 10/26* | (2006.01) |
| *B60W 10/30* | (2006.01) |
| *B60W 30/18* | (2012.01) |
| *B60W 10/06* | (2006.01) |

(52) U.S. Cl.
CPC ............ *B60W 20/13* (2016.01); *B60W 10/06* (2013.01); *B60W 10/26* (2013.01); *B60W 10/30* (2013.01); *B60W 30/18* (2013.01); *B60W 2510/244* (2013.01); *B60W 2510/305* (2013.01);
(Continued)

(58) Field of Classification Search
CPC ...... B60W 20/13; B60W 10/06; B60W 10/26; B60W 10/30; B60W 30/18; B60W 2510/244; B60W 2510/305; B60W 2520/10; B60W 2710/0677; B60W 2710/244
See application file for complete search history.

(56) References Cited

U.S. PATENT DOCUMENTS

| | | | |
|---|---|---|---|
| 2009/0018721 A1* | 1/2009 | Mian ................... | G06K 9/4604 |
| | | | 701/31.4 |
| 2017/0320482 A1* | 11/2017 | Leone .................. | B60W 10/08 |

(Continued)

FOREIGN PATENT DOCUMENTS

| | | |
|---|---|---|
| DE | 102008008238 A1 | 8/2008 |
| DE | 102007038585 A1 | 3/2009 |

(Continued)

OTHER PUBLICATIONS

Translation DE102008008238A1.*
(Continued)

*Primary Examiner* — Tyler J Lee
*Assistant Examiner* — Yufeng Zhang
(74) *Attorney, Agent, or Firm* — Maier & Maier, PLLC

(57) ABSTRACT

A method for operating a hybrid electric vehicle including an electric machine, a battery and an internal combustion engine, the load point of which is shifted upward to drive the electric machine for charging the battery in the generator mode, wherein a target state of charge of the battery is specified; a required target charging capacity is determined; the load point of the internal combustion engine initially is only shifted upward within an engine-map range of the internal combustion engine.

16 Claims, 2 Drawing Sheets

(52) U.S. Cl.
CPC . *B60W 2520/10* (2013.01); *B60W 2710/0677* (2013.01); *B60W 2710/244* (2013.01)

(56) References Cited

U.S. PATENT DOCUMENTS

2019/0249640 A1\* 8/2019 Miller .................. B60W 20/15
2019/0368458 A1\* 12/2019 Chen .................. B60W 30/194

FOREIGN PATENT DOCUMENTS

| DE | 102010022018 A1 | 12/2011 |
| DE | 102013215519 A1 | 2/2015 |
| DE | 102013020759 A1 | 6/2015 |
| DE | 102016207037 A1 | 10/2017 |

OTHER PUBLICATIONS

Translation DE102016207037A1.\*
German Search Report dated Mar. 20, 2019 in corresponding German Application No. 10 2018 211 134.0; 28 pages.

\* cited by examiner

METHOD AND CONTROL APPARATUS FOR OPERATING A HYBRID ELECTRIC VEHICLE

FIELD

The disclosure relates to a method for operating a hybrid electric vehicle. Furthermore, the invention relates to a control apparatus for operating a hybrid electric vehicle, as well as to a hybrid electric vehicle having such a control apparatus.

BACKGROUND

It is generally known that, in hybrid electric vehicles, an electric machine used to propel the vehicle also can be operated in a generator mode to charge a battery of the vehicle.

DE 10 2010 022 018 A1 describes a method for operating a vehicle having an internal combustion engine and having a generator. During the operation of the internal combustion engine, a portion of the torque produced by the same on a shaft is used to produce an electric current via the generator. In a first mode, the partial torque is set such that a degree of efficiency is adjusted to a maximum value. In a second mode, the partial torque is set such that the degree of efficiency is adjusted to a lower value. In the case that a battery of the vehicle is required to be charged more quickly in an urban environment, because it is intended to only operate the internal combustion engine for a short period of time and to operate purely electrically after the battery is charged, the partial torque is set to the second mode.

DE 10 2013 020 759 A1 shows methods for regulating a hybrid drive in a vehicle. A target charging capacity of a battery of the vehicle is reduced in such a manner that an internal combustion engine is operated at an optimal operating point during a charging procedure of the battery.

DE 10 2008 008 238 A1 shows a charging strategy for a hybrid drive. The charging strategy comprises various charging and discharging functions for a battery of a vehicle, which are adjusted by shifting the load point of an internal combustion engine.

SUMMARY

The object underlying the present invention is to provide a method and a control apparatus for a hybrid electric vehicle, by means of which it is possible to provide electrical energy for a hybrid electric vehicle in a particularly effective manner.

This object is solved by a method and a control apparatus for operating a hybrid electric vehicle with the characteristics of the independent claims. Advantageous embodiments with useful and non-trivial developments of the invention are listed in the dependent claims.

In the method for operating a hybrid electric vehicle according to the invention, comprising an electric machine, a battery and an internal combustion engine, a load point of the internal combustion engine is shifted upward to drive the electric machine charging the battery in the generator mode. The method according to the invention is distinguished by specifying a target charging state of the battery for a future point in time in dependence on multiple parameters defining an electric power demand of the hybrid electric vehicle. Subsequently, a required target charging capacity is determined to achieve the specified target charging state of the battery. The load point of the internal combustion engine first is only shifted upward within an engine-map range of the internal combustion engine classified as favorable with regards to a degree of efficiency and/or acoustic emissions and in dependence on the determined target charging capacity. The load point of the internal combustion engine is only shifted upward further, thus departing the engine-map range of the internal combustion engine classified as favorable, if it is determined within a specified time interval and based on a detected, actual mean charging capacity of the battery, that the target charging state will not be achieved solely by shifting the load point upward within the engine-map range classified as favorable. In particular, this process is performed continuously according to the invention. For example, the future point in time can be move forward continuously in certain intervals and the target charging capacity can correspondingly be established anew for the new future point in time. The upward shift, or shifts, of the load point also is/are performed continuously as needed.

It also is provided according to the invention, that a kind of escalation is initiated if the actual charging capacity will not cause the specified target charging state of the battery at the future point in time to be achieved based on the upward load point shift of the internal combustion engine within the engine-map range classified as favorable, according to which escalation less favorable movements regarding the upward load point shift of the internal combustion engine are performed, always with regards to the degree of efficiency and/or the acoustic emissions of the internal combustion engine.

The electrical energy required for the electrical system and especially for the charging of the battery will be achieved by the optimized load point shift, or shift of the operating point of the internal combustion engine, if it is not generated in sufficient measure by recuperation. Herein, those shifts in the load point are favored in particular, for which the specific consumption graphs are positioned closely together and which have acoustically normal states. If the hybrid electric vehicle is in motion, different load point shifts will be acoustically favorable than would be for a hybrid electric vehicle in a motionless state. Very great load point shifts will result in a very high load for the electric machine and the battery, as well as in thermal and electrical losses, whereby such shifts are not considered to be very favorable. It furthermore is possible by means of the method according to the invention to set a nearly constant state of charge of the battery at a nearly constant rotational speed of the internal combustion engine. In particular, an injection volume, an internal torque and/or an indicated pressure of the internal combustion engine are adjusted in the course of the upward load point shift of the internal combustion engine. This facilitates the smooth operation of the internal combustion engine and the overall acoustic perception of the hybrid electric vehicle.

Furthermore, the target charging capacity is set in dependence on various parameters in the method according to the invention, and the momentary actual charging capacity of the battery is reviewed in a very specific time interval to monitor whether the target state of charge of the battery has been achieved. If the target state of charge of the battery, that is, the target energy level related to the battery, is not achieved, in particular because there has been a deviation from the mean target charging capacity, said escalation is triggered, such that it is now permissible to reach operating points across the entire map of the internal combustion engine and of the entire drive train which do not correspond to an optimum with regards to the degree of efficiency and/or the acoustic emissions. In the hybrid electric vehicle, the degree of efficiency of the internal combustion engine and of the electric machine is of great consequence, as are the drive line components positioned operating between the two. Acoustically, however, conspicuities usually originate from the internal combustion engine and also, to a lesser degree, from the transmission.

The method according to the invention therefore meets the requirement to generate electrical energy from fuel only with load point shifts which are particular favorable in terms of energy and acoustics, if possible. The electrical energy demand of the electrical system of the hybrid electric vehicle is met in this manner, on average. The method according to the invention thus comprises a defined escalation mechanism, which makes it possible, if necessary, to use unfavorable load point shifts of the internal combustion engine as well, whereby the method according to the invention predominantly uses load point shifts which are particularly favorable energetically and/or acoustically across the entire map of the internal combustion engine, and in particular not only at a very specific rotational speed of the internal combustion engine.

Thus, the electrical system of the hybrid electric vehicle can on average be supplied with an appropriate charging capacity by means of the method according to the invention, and an appropriate target charging capacity can be realized in the battery. Thus, it is possible, for example, to secure an energy reserve within the battery at a very specific point in time for certain emission-related measures. Overall, a particularly effective electrical energy supply for hybrid electric vehicles can be realized by means of the method according to the invention.

One advantageous embodiment of the invention provides that the target state of charge of the battery is specified in dependence on a current state of charge of the battery, an energy demand of auxiliary equipment of the hybrid electric vehicle and/or a speed of the hybrid electric vehicle. Thus, the target state of charge of the battery can be specified for a very specific future point in time under consideration of the current state of charge of the battery. Depending on the actual energy demand of auxiliary equipment of the hybrid electric vehicle, the target state of charge also can be specified correspondingly for a very specific point in time in the future. Furthermore, it is possible, under consideration of the speed of the hybrid electric vehicle, to adjust the target state of charge to an optimum for a specific point in time in the future.

Another advantageous embodiment of the invention provides that the engine-map range classified as favorable is enlarged to a greater degree toward increased acoustic emissions of the internal combustion engine as the traveling speed of the hybrid electric vehicle increases. This is due to the fact that the greater the speed of the hybrid electric vehicle, the more prevalent the wind noise and the rolling noise of the hybrid electric vehicle will be. Therefore, it is possible to shift the engine-map range classified as favorable in terms of acoustic emissions toward increased acoustic emissions of the internal combustion engine without having the vehicle occupants perceive the increased emissions of the internal combustion engine. Thus, the specified target state of charge can be achieved in a simple manner while remaining within the engine-map range classified as favorable with regards to current acoustic emissions.

According to another advantageous embodiment of the invention, it is provided that a threshold value is set for the degree of efficiency and/or for the acoustic emissions, which defines the engine-map range of the internal combustion engine classified as favorable. In this manner, the engine-map range of the internal combustion engine classified as favorable can be clearly defined. For example, it is conceivable that the threshold value for the degree of efficiency and/or for the acoustic emissions is/are specified in dependence on a current driving mode of the hybrid electric vehicle. For example, if the hybrid electric vehicle is operated in a sport mode, it is possible that the threshold value for the degree of efficiency is lowered compared to a standard value and that the threshold value for the acoustic emissions is raised compared to a standard value. This is because, in sport mode, a driver usually places the greatest importance on having as much drive power available as possible, while he might welcome a certain acoustic presence of the internal combustion engine to emphasize a sportive driving characteristic. It also is possible, for example, to specify the threshold values for the degree of efficiency and the acoustic emissions in dependence on a current environment of the hybrid electric vehicle. For example, it is conceivable that the hybrid electric vehicle is traveling through an environmental zone, in which it is desired to travel at particularly low emission levels in terms of exhaust gases and noise. In this case, it is possible, for example, that the threshold value for the degree of efficiency is raised compared to a standard value and that the threshold value for the acoustic emissions is lowered compared to a standard value. The drive-mode-dependent and/or environment-dependent adjustment of the threshold values makes it possible to adapt the necessary upward load point shifts of the internal combustion engine to the respective situation in a particularly suitable manner.

In another advantageous embodiment of the invention, it is provided that the load point of the internal combustion engine is continually increased incrementally outside of the engine-map range of the internal combustion engine classified as favorable, if it is determined within the specified time interval on the basis of the detected actual mean charging capacity of the battery that the target state of charge will not be achieved by the preceding upward load point shifts. It also is provided that the upward load point shift is performed successively, such that particularly optimal operating states of the internal combustion engine with regards to its degree of efficiency and/or its acoustic emissions are only departed from bit by bit, insofar as this is required to achieve the specified target state of charge. By departing from the optimal operational states of the internal combustion engine bit by bit, that is, slowly, it can be ensured that the same is operated at or at close to optimal operational states for as long as possible. On the one hand, this makes it possible to ensure that the specified target state of charge is achieved with highest-possible certainty, on the other hand, it makes it possible to ensure that the battery is charged in an energetically and acoustically optimal manner.

Another advantageous embodiment of the invention provides that a torque limit of the electric machine is set in relation to its generator mode and that the upward load point shift is only performed insofar as it does not cause said torque limit to be exceeded. This is because a partial torque of the internal combustion engine is used during generator mode via a shaft to produce electricity by means of the electric machine. In other words, torque limits of the electric machine related to its generator mode are considered, such that only possible and sensible load point shifts of the internal combustion engine are considered and implemented, such that the aforementioned partial torque does not run too high. Thus, it can be ensured that the required electrical energy or power needed to achieve the target state of charge is only produced by the generator via particularly favorable load point shifts.

According to another advantageous embodiment of the invention, it is provided that predictive data are made available, which describe future state of charge changes of the battery via recuperation, and that these predictive data are considered during the upward load point shift of the internal combustion engine and/or during the specification of the target state of charge. Knowing the future recuperation potential makes it possible to adjust the upward load point shift of the internal combustion engine accordingly. It also is possible to specify the target state of charge accordingly, based on the knowledge of the future recuperation potential. For example, if it can be anticipated that a relatively high volume of electrical energy can be reclaimed by recuperation, the upward load point shift of the internal combustion engine can be performed so moderately that the engine-map range of the internal combustion engine classified as favorable is not departed from or only departed from to a small degree. It also is possible to select a low or high target state of charge corresponding to the knowledge of the future recuperation potential. As the required upward load point shift also depends on the specified target state of charge, this can support a particularly efficient operation of the hybrid electric vehicle.

In another advantageous embodiment of the invention, it is provided that predictive data regarding the operational strategy of the hybrid electric vehicle are made available, which describe when the hybrid electric vehicle will be driven by means of the electrical machine and/or by means of the internal combustion engine in the future, and that these predictive data are considered in the operational strategy regarding the upward load point shift of the internal combustion engine and/or when specifying the target state of charge. For example, if it is foreseeable that the electric machine of the hybrid electric vehicle will be used very little or not at all to drive the hybrid electric vehicle in the near future, the upward load point shifts of the internal combustion engine can be performed relatively moderately and/or relatively low target state of charge can be selected from the onset. However, if it is foreseeable that the electric machine will be used greatly to drive the hybrid electric vehicle, the exact opposite approach can be taken.

Another advantageous embodiment of the invention provides that a profile of the route yet to be traveled by the hybrid electric vehicle is considered in the upward load point shift of the internal combustion engine and/or in the specification of the target state of charge. This makes it possible to predict the future energy demand of the hybrid electric vehicle with particular precision, so as to then adjust the upward load point shift and/or adapt the specification of target state of charge accordingly.

According to another advantageous embodiment of the invention, it is provided that a driver profile of a driver of the hybrid electric vehicle is considered in the upward load point shift of the internal combustion engine and/or in the specification of the target state of charge. If the driver profile shows that the driver in question is relatively gentle, the upward load point shifts can be performed very moderately, for example, or a relatively low target state of charge can be selected. In the case of a driver profile with a very sportive driving style, for example, the opposite approach can be taken. Thus, it is possible to provide electrical energy for the hybrid electric vehicle in a particularly effective manner under consideration of the respective driver profile.

The inventive control apparatus for a hybrid electric vehicle is configured to execute the method according to the invention or an advantageous embodiment of the method according to the invention. Advantageous designs of the method according to the invention are to be considered advantageous designs of the control apparatus according to the invention, and vice versa, wherein the control apparatus in particular includes means for executing the steps of the method.

The hybrid electric vehicle according to the invention comprises the control apparatus according to the invention or an advantageous embodiment of the control apparatus according to the invention.

BRIEF DESCRIPTION OF THE DRAWINGS

Further advantages, characteristics and details of the invention can be found in the following description of preferred exemplary embodiments and in the drawings. The characteristics and combinations of characteristics mentioned in the description above, as well as the characteristics and combinations of characteristics mentioned in the following description of the drawings and/or any characteristics and combinations of characteristics shown only in the drawings are not only applicable in the respective combination shown, but also in other combinations or on their own, without departing from the context of the invention.

DETAILED DESCRIPTION

Figure 1:
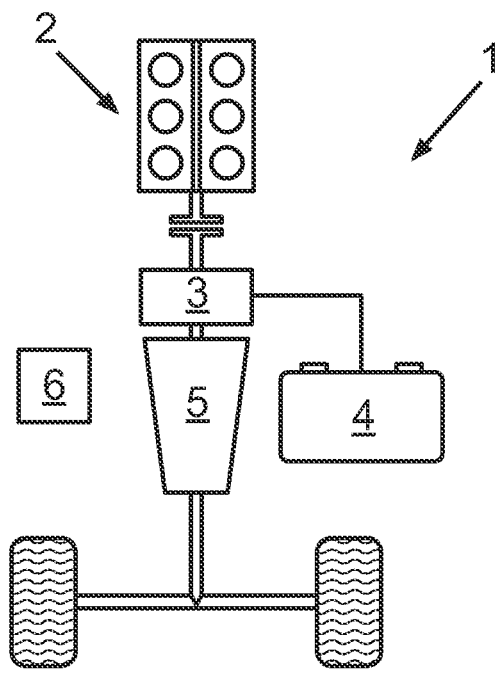
FIG. 1 depicts a significantly schematized representation of a hybrid electric vehicle comprising an electric machine, a battery and an internal combustion engine.

A hybrid electric vehicle 1 is shown in FIG. 1 in a significantly schematic representation. The hybrid electric vehicle 1 comprises an internal combustion engine 2, an electric machine 3, a battery 4 for supplying electrical energy to the electric machine, an electrical system of the hybrid electric vehicle 1 not shown here in detail, a transmission 5 and a control apparatus 6 for controlling a generator mode of the electric machine 3 for charging the battery 4.

In the present case, the hybrid electric vehicle 1 is shown having a parallel hybrid drive. However, the following explanations regarding the operation of the hybrid electric vehicle 1 are not limited to parallel hybrid drives, but can also be applicable to serial hybrid drives or power-split hybrid drives. The hybrid electric vehicle 1 can, for example, be a mild hybrid or a full hybrid.

Figure 2:
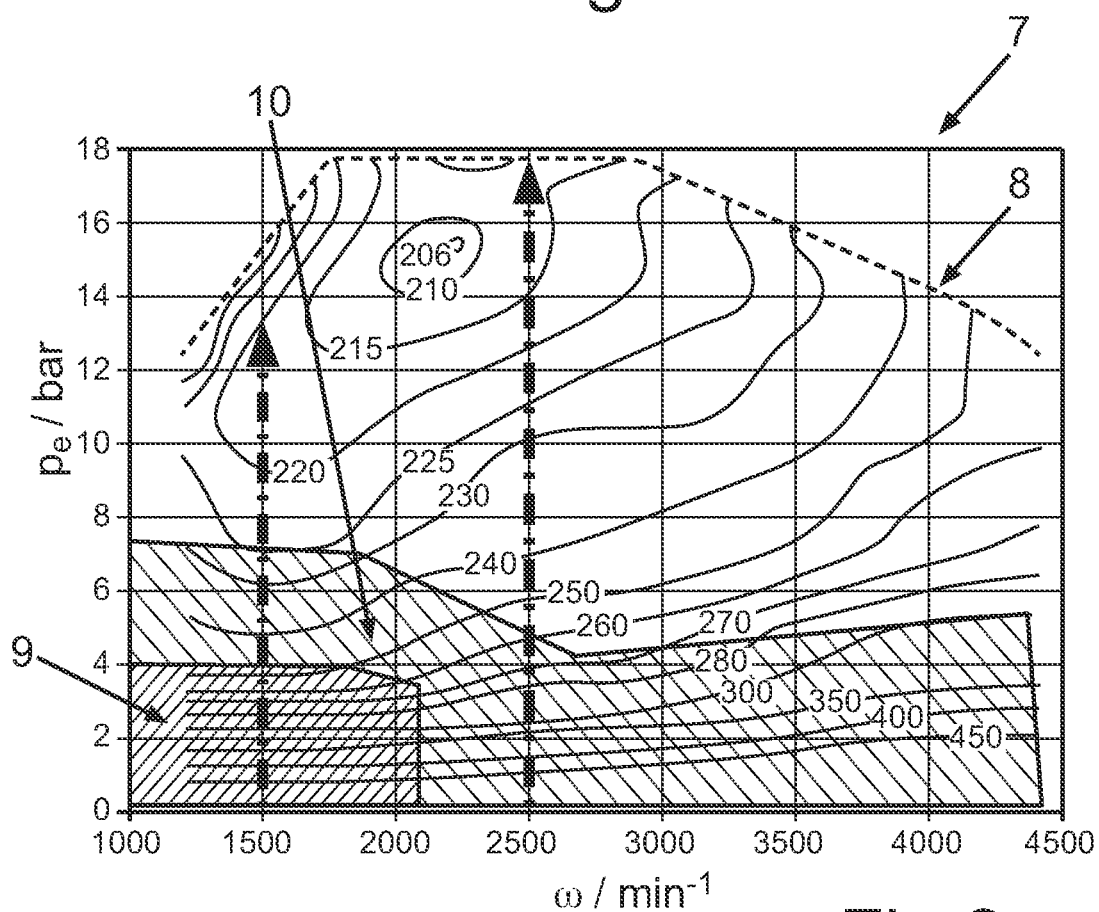
FIG. 2 depicts a map of the internal combustion engine, wherein favorable and less favorable, with regards to a degree of efficiency of the internal combustion engine, engine-map ranges and load point shifts of the internal combustion engine are schematically indicated.

FIG. 2 shows a consumption map 7 for the internal combustion engine 2. The consumption map 7 also is referred to as a conchoid diagram, conchoid curve or an efficiency map; it shows the specific fuel consumption against the effective average pressure and the rotational speed of the internal combustion engine 2. The map is limited by the minimum and maximum rotational speed on the horizontal axis, and by the full-load curve 8 of the internal combustion engine 2 on the vertical axis. Therein, lines with identical specific fuel consumption (206, 210, 215, 220, 225, 230, 240, 250, 260, 270, 280, 300, 350, 400, 450) form a conchoid pattern, which is why the map is called a "conchoid diagram."

In the following, a method for operating the hybrid electric vehicle 1 is explained in more detail, in which method a load point of the internal combustion engine 2 is shifted upward to drive the electric machine 3 in its generator mode for charging the battery 4. Firstly, a target charging state of the battery 4 for a future point in time is specified in dependence on multiple parameters defining the electric energy demand of the hybrid electric vehicle 1. For example, the target state of charge of the battery 4 can be specified in dependence on a current state of charge of the battery 4, an energy demand of auxiliary equipment of the hybrid electric vehicle 1 and/or a speed of the hybrid electric vehicle 1. Furthermore, predictive data can be made available, which describe or predict future state of charge changes of the battery 4 via recuperation, wherein these predictive data are considered during the specification of the target state of charge. Additionally, predictive data regarding the operational strategy of the hybrid electric vehicle 1 can be made available, which describe when the hybrid electric vehicle 1 will be driven by means of the electrical machine 3 and/or by means of the internal combustion engine 2 in the future. These predictive data can also be considered when specifying the target state of charge of the battery 4. Additionally, a profile of the route yet to be traveled by the hybrid electric vehicle 1, and also a driver profile of a driver of the hybrid electric vehicle 1, can be considered in the specification of the target state of charge.

A target charging capacity regarding the battery 4 required to achieve the specified target state of charge of the battery 4 is then determined. The load point of the internal combustion engine 2 first is only shifted upward by means of the control apparatus 7 within an engine-map range 9 of the internal combustion engine 2 classified as favorable with regards to a degree of efficiency and/or acoustic emission and in dependence on the determined target charging capacity. The load point of the internal combustion engine 2 is only shifted upward further, thus departing the engine-map range 9 classified as favorable, toward a less favorable engine-map range 10 if it is determined within a specified time interval and based on a detected, actual mean charging capacity of the battery 4, that the specified target charging state will not be achieved by the specified future point in time solely by shifting the load point upward within the engine-map range 9 classified as favorable.

The load point of the internal combustion engine 2 can also be continually increased incrementally outside of the engine-map range 9 of the internal combustion engine 2 classified as favorable, if it is determined within the specified time interval on the basis of the detected actual mean charging capacity of the battery 4 that the target state of charge will not be achieved by the preceding upward load point shifts. Therein, a torque limit of the electric machine 3 is always considered in relation to its generator mode, and the upward load point shift is only executed insofar as it does not cause said torque limit to be exceeded.

The electrical energy or power required to achieve the specified target state of charge of the battery related to a very specific future point in time therefore is achieved via optimized operating point shifts of the internal combustion engine 2, if said energy or power has not been provided by recuperation, for example. Herein, those shifts within the map 7 are favored in particular, for which the specific consumption graphs are positioned closely together and via which acoustically normal states of the internal combustion engine are achieved. If the hybrid electric vehicle 1 is in motion, different shifts are favored than would be for a hybrid electric vehicle 1 in a motionless state. The method for operating the hybrid electric vehicle 1 is used to set a nearly constant state of charge of the battery 4 while a rotational speed of the internal combustion engine 2 is kept as constant as possible. Corresponding to a deviation in the actual mean charging capacity, which actually occurs, an injection volume, an interior torque or an indicated pressure of the internal combustion engine 2 are adjusted in particular. This facilitates the smooth operation of the internal combustion engine 2 and the overall acoustic perception of the hybrid electric vehicle 1.

Therein, an escalation is initiated if the charging capacity will not reach the target charging capacity within the engine-map range 9 classified as favorable, said escalation resulting in less and less favorable shifts within the consumption map 7 regarding the degree of efficiency and/or the acoustics. Thus, only when actually necessary are operating points targeted across the entire consumption map 7, which do not correspond to an optimum with regards to degree of efficiency and/or acoustics. The required electrical energy or power thus only is generated from fuel with shifts that are particularly favorable with regards to energy and acoustics, whereby the requirements of the electrical system can be met on average. According to a defined escalation mechanism, unfavorable load point shifts are used, wherein load point shifts are used which are particularly favorable energetically and/or acoustically across the entire consumption map 7, and not only at a very specific rotational speed. Thus, it is possible to provide electrical energy for the hybrid electric vehicle 1 in a particularly effective manner.

Figure 3:
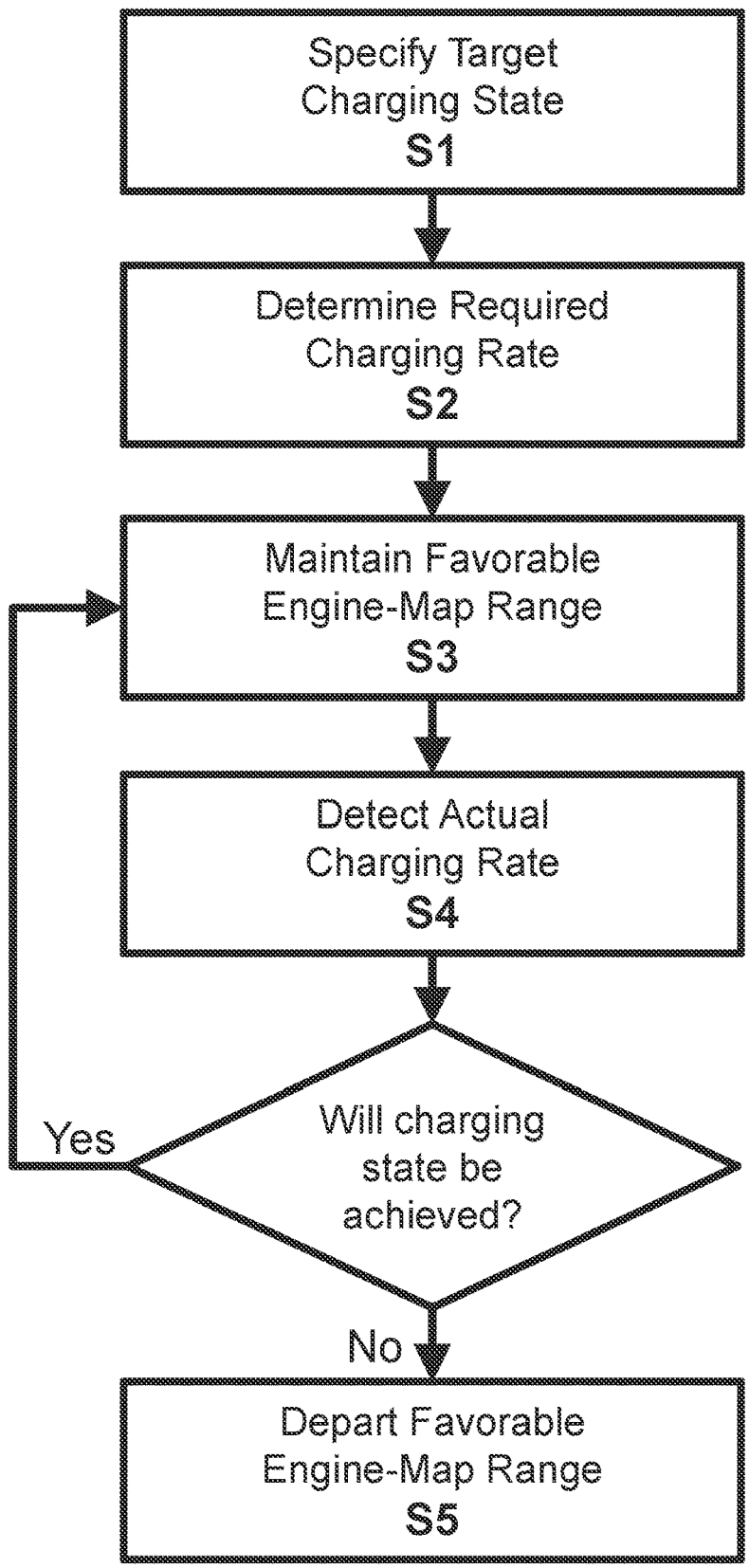
FIG. 3 depicts a flow chart of a control method according to the present disclosure.

FIG. 3 describes an exemplary method by which the hybrid electric vehicle may be operated. In S1, a target charging state of the battery 4 for a future point in time is specified. In S2, a target charging capacity for the battery 4 to reach the specified target state of charge is determined. In S3, the load point of the internal combustion engine 2 is maintained within an engine-map range 9 classified as favorable with regards to a degree of efficiency and/or acoustic emission. In S5, the load point of the internal combustion engine is only shifted upward further, departing the engine-map range 9 classified as favorable, if it is determined in S4 that, within a specified time interval and based on a detected, actual mean charging capacity of the battery, the specified target charging state will not be achieved by the specified future point in time solely by maintaining the engine-map range 9 classified as favorable.

The invention claimed is:

1. A method for operating a hybrid electric vehicle, comprising:
   an electric machine, a battery and an internal combustion engine a load point of which is shifted upward to drive the electric machine for charging the battery in a generator mode,
   wherein a target charging state of the battery for a future point in time is specified in dependence on multiple parameters defining a future electric energy demand of the hybrid electric vehicle;
   a required target charging rate is determined to achieve the specified target charging state of the battery;
   the load point of the internal combustion engine first is only shifted upward within an engine-map range of the internal combustion engine classified as favorable with regards to a degree of efficiency and/or acoustic emissions and in dependence on the determined target charging rate;

the load point of the internal combustion engine is shifted upward further, thus departing the engine-map range of the internal combustion engine classified as favorable, if it is determined within a specified time interval and based on a detected, actual mean charging rate of the battery, that the target charging state will not be achieved solely by shifting the load point upward within the engine-map range classified as favorable.

2. The method according to claim 1, wherein the multiple parameters defining the future electric energy demand of the hybrid electric vehicle comprise at least one of a current state of charge of the battery, an energy demand of auxiliary equipment of the hybrid electric vehicle, and a speed of the hybrid electric vehicle.

3. The method according to claim 1, wherein the engine-map range classified as favorable is increased to a greater degree toward increased acoustic emissions of the internal combustion engine as the traveling speed of the hybrid electric vehicle increases.

4. The method according to claim 1, wherein a threshold value is set for the degree of efficiency and/or for the acoustic emissions, which defines the engine-map range of the internal combustion engine classified as favorable.

5. The method according to claim 1, wherein the load point of the internal combustion engine is continually increased incrementally outside of the engine-map range of the internal combustion engine classified as favorable, if it is determined within the specified time interval on the basis of the detected actual mean charging rate of the battery that the target state of charge will not be achieved by the preceding upward load point shifts.

6. The method according to claim 1, wherein a torque limit of the electric machine is set in relation to its generator mode and that the upward load point shift is only performed insofar as it does not cause said torque limit to be exceeded.

7. The method according to claim 1, wherein the multiple parameters defining the future electric energy demand of the hybrid electric vehicle comprise predictive data, which describe future state of charge changes of the battery via recuperation, and that these predictive data are considered during the upward load point shift of the internal combustion engine.

8. The method according to claim 1, wherein the multiple parameters defining the future electric energy demand of the hybrid electric vehicle comprise predictive data regarding an operational strategy of the hybrid electric vehicle, which describe when the hybrid electric vehicle will be driven by means of the electrical machine and/or by means of the internal combustion engine in the future, and that these predictive data are considered in the operational strategy regarding the upward load point shift of the internal combustion engine.

9. The method according to claim 1, wherein a profile of a route yet to be traveled by the hybrid electric vehicle is considered in the upward load point shift of the internal combustion engine.

10. The method according to claim 1, wherein a driver profile of a driver of the hybrid electric vehicle is considered in the upward load point shift of the internal combustion engine, the driver profile comprising at least an indication of a gentle or a sportive driving style of the driver.

11. The method according to claim 4, wherein the threshold value is adjusted from a standard threshold value depending on a driving mode of the hybrid electric vehicle, the driving mode comprising at least a sport mode.

12. The method according to claim 4, wherein the threshold value is adjusted from a standard threshold value depending on a current environment of the hybrid electric vehicle.

13. The method according to 1, wherein a deviation in the detected, actual mean charging rate of the battery is compensated for by adjusting an injection volume, an interior torque, or an indicated pressure of the internal combustion engine.

14. The method according to 1, wherein predictive data are made available, which describe future state of charge changes of the battery via recuperation, and that these predictive data are considered during the specification of the target state of charge.

15. The method according to 1, wherein predictive data regarding an operational strategy of the hybrid electric vehicle are made available, which describe when the hybrid electric vehicle will be driven by means of the electrical machine and/or by means of the internal combustion engine in the future, and that these predictive data are considered when specifying the target state of charge.

16. The method according to 1, wherein a driver profile of a driver of the hybrid electric vehicle is considered in the specification of the target state of charge, the driver profile comprising at least an indication of a gentle or a sportive driving style of the driver.

\* \* \* \* \*